United States Patent
Huebner et al.

(10) Patent No.: US 9,533,622 B2
(45) Date of Patent: Jan. 3, 2017

(54) VERSATILE INSTRUMENT PANEL STORAGE

(71) Applicant: FORD GLOBAL TECHNOLOGIES, LLC, Dearborn, MI (US)

(72) Inventors: Annette Lynn Huebner, White Lake, MI (US); Matthew B. Rutman, Canton, MI (US); Kristin Ann Hellman, Walled Lake, MI (US); Ryan Welch, Ottawa Lake, MI (US)

(73) Assignee: Ford Global Technologies, LLC, Darborn, MI (US)

(*) Notice: Subject to any disclaimer, the term of this patent is extended or adjusted under 35 U.S.C. 154(b) by 1 day.

(21) Appl. No.: 14/681,367

(22) Filed: Apr. 8, 2015

(65) Prior Publication Data

US 2016/0297368 A1    Oct. 13, 2016

(51) Int. Cl.
*B60R 7/04* (2006.01)
*B60R 7/06* (2006.01)
*B60R 11/00* (2006.01)

(52) U.S. Cl.
CPC . *B60R 7/04* (2013.01); *B60R 7/06* (2013.01); *B60R 11/00* (2013.01); *B60R 2011/0005* (2013.01); *B60R 2011/0047* (2013.01); *B60R 2011/0082* (2013.01); *B60R 2011/0087* (2013.01)

(58) Field of Classification Search
CPC .............. B60R 7/04; B60R 7/06; B60R 11/00; B60R 2011/0005; B60R 2011/0047; B60R 2011/0082; B60R 2011/0087
USPC .................................. 296/24.34, 37.8, 37.12
See application file for complete search history.

(56) References Cited

U.S. PATENT DOCUMENTS

| | | | | | |
|---|---|---|---|---|---|
| 2,657,967 | A | * | 11/1953 | Gilchrist | B60R 7/06 312/246 |
| 5,197,775 | A | * | 3/1993 | Reeber | B60R 7/06 296/37.12 |
| 5,558,385 | A | * | 9/1996 | Gross | B60R 7/06 296/37.12 |
| 6,042,168 | A | * | 3/2000 | Bieri | B60R 7/06 224/281 |

(Continued)

FOREIGN PATENT DOCUMENTS

| DE | 102011010207 A1 | 10/2011 |
|---|---|---|
| DE | 102012009675 A1 | 8/2013 |

(Continued)

OTHER PUBLICATIONS

English machine translation for DE102011010207.

(Continued)

*Primary Examiner* — Gregory Blankenship
(74) *Attorney, Agent, or Firm* — Vichit Chea; King & Schickli, PLLC

(57) ABSTRACT

A vehicle dash panel storage compartment includes a storage compartment including at least a top, a bottom, and sides defining a storage slot, and a pivoting mechanism configured to translate the storage compartment between a stowed configuration within an interior of a housing of the instrument panel and a variety of deployed configurations. Optionally, the top may be hingedly connected to the storage compartment. The pivoting mechanism may include at least one strut pivotally connected at a first end to a support and at a second end to the storage compartment.

18 Claims, 4 Drawing Sheets

(56) References Cited

U.S. PATENT DOCUMENTS

| | | | |
|---|---|---|---|
| 6,629,716 B2* | 10/2003 | Shibata | B60K 37/06 296/37.7 |
| 6,866,319 B2* | 3/2005 | Hupfer | B60R 7/04 224/282 |
| 6,929,304 B1* | 8/2005 | Dry | A47C 7/72 224/539 |
| 7,455,341 B2* | 11/2008 | Miyashita | B60N 3/102 220/345.4 |
| 8,602,476 B2* | 12/2013 | Doll | B60R 7/06 296/37.12 |
| 8,714,093 B2* | 5/2014 | Rigner | B60R 7/06 108/45 |
| 8,727,413 B2 | 5/2014 | Seiller et al. | |
| 8,740,278 B1* | 6/2014 | Mally | B60R 7/06 296/37.12 |
| 2002/0101090 A1* | 8/2002 | Steingrebe | B64D 11/003 296/37.8 |
| 2006/0197353 A1* | 9/2006 | Hanzel | B60R 11/00 296/37.12 |
| 2009/0058123 A1* | 3/2009 | Schaal | B60R 7/06 296/37.12 |
| 2009/0295183 A1* | 12/2009 | Piekny | B60R 7/06 296/37.1 |
| 2010/0148531 A1 | 6/2010 | Evans et al. | |
| 2012/0006235 A1* | 1/2012 | Rigner | B60R 7/06 108/38 |
| 2012/0319422 A1* | 12/2012 | Kang | B60R 7/04 296/24.34 |
| 2013/0057011 A1* | 3/2013 | Yamagishi | B60R 7/04 296/24.34 |
| 2014/0175824 A1* | 6/2014 | Park | B60R 7/06 296/37.12 |
| 2014/0339847 A1* | 11/2014 | Brunard | B60R 11/02 296/37.12 |
| 2015/0203015 A1* | 7/2015 | Evans | B60N 3/08 296/37.12 |
| 2016/0297368 A1* | 10/2016 | Huebner | B60R 7/06 |

FOREIGN PATENT DOCUMENTS

| | | |
|---|---|---|
| FR | 2990665 A1 | 5/2012 |
| GB | 2341366 A | 9/1998 |
| JP | 2005262986 A | 9/2005 |

OTHER PUBLICATIONS

English machine translation for DE102012009675.
English machine translation for FR2990665.
English machine translation for JP2005262986.

* cited by examiner

VERSATILE INSTRUMENT PANEL STORAGE

TECHNICAL FIELD

This disclosure relates generally to motor vehicles, and more particularly to an improved dash panel storage compartment design for a motor vehicle.

BACKGROUND

Space in the modern motor vehicle is at a premium. As an example, with reference to FIG. 1 only a finite amount of space can be devoted to a conventional vehicle glove box or glove compartment 10 (or indeed any other storage compartment conventionally or conveniently disposed on or in a vehicle dash panel 12) in order to accommodate other necessary and desired components typically disposed in, on, or near the vehicle dash panel, for example audio systems (not shown), speakers (not shown), center consoles 14, HVAC registers 16 and ductwork not shown), audio system controller/information center/navigation system control panels (shown generally as ref. num. 18), etc. For a conventional vehicle glove box 10 design, in view of the many components which must be packaged in the dash, it may not be possible to alter the glove box to provide a deeper or wider storage space because of lack of room to expand the glove box rearwardly or to the side. Therefore, any increase in storage space or versatility of a glove box often comes at the expense of passenger legroom. However, particularly in smaller vehicles passenger legroom is also at a premium and so represents a significant consideration to which extensive engineering expertise and effort are applied.

Moreover, in certain vehicles it may not be necessary or desirable to provide a full-sized glove box. Instead, the user may prefer a sleek, uninterrupted dash panel design and may only require dash panel storage capable of holding small items such as a purse, small shopping bags, smaller electronic devices, etc.

To solve this and other problems, the present disclosure relates to a vehicle dash panel storage compartment configured to provide storage capacity for a passenger while minimizing intrusion into passenger legroom. Advantageously, the dash panel storage compartment of this disclosure is configured for deployment in a variety of configurations, maximizing utility and convenience.

SUMMARY

In accordance with the purposes and benefits described herein, a low-profile vehicle dash panel storage compartment is provided, comprising in one aspect a storage compartment and a pivoting mechanism configured to translate the storage compartment between a stowed configuration within an interior of a housing of the instrument panel and a plurality of deployed configurations. The storage compartment includes at least a top, a bottom, and sides defining a storage slot. In embodiments, the top is hingedly connected to the storage compartment. In another aspect, a vehicle dash panel including the dash panel storage compartment described above is described.

The plurality of deployed configurations may include a first deployed configuration wherein only the storage slot is accessible below the instrument panel housing, a second deployed configuration wherein the storage slot and the storage compartment top are accessible below the instrument panel housing, and a third deployed configuration wherein the storage compartment top is disposed substantially adjacent to a vertical plane defined by the instrument panel housing. The pivoting mechanism may include at least one strut pivotally connected at a first end to a support and at a second end to the storage compartment. In embodiments, the pivoting mechanism includes four struts each pivotally connected at a first end to the support and at a second end to the storage compartment.

In the following description, there are shown and described embodiments of the disclosed dash panel storage compartment. As it should be realized, the dash panel storage compartment is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed dash panel storage compartment, and together with the description serve to explain certain principles thereof. In the drawing.

Reference will now be made in detail to embodiments of the disclosed motor vehicle glove box assembly, examples of which are illustrated in the accompanying drawing figures.

DETAILED DESCRIPTION

Figure 1:
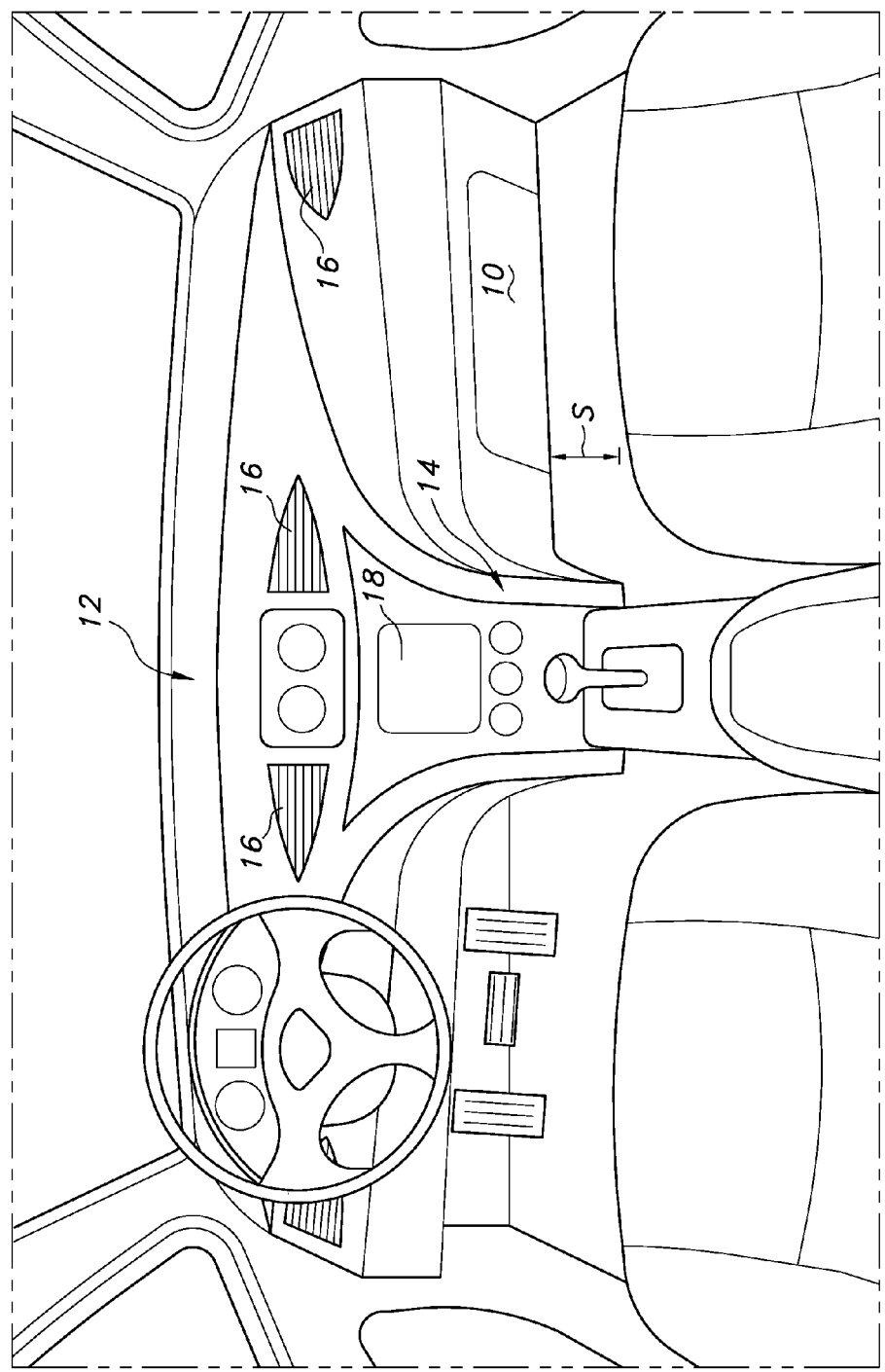
FIG. 1 depicts a prior art vehicle dash panel including a glove box.
Figure 2A:
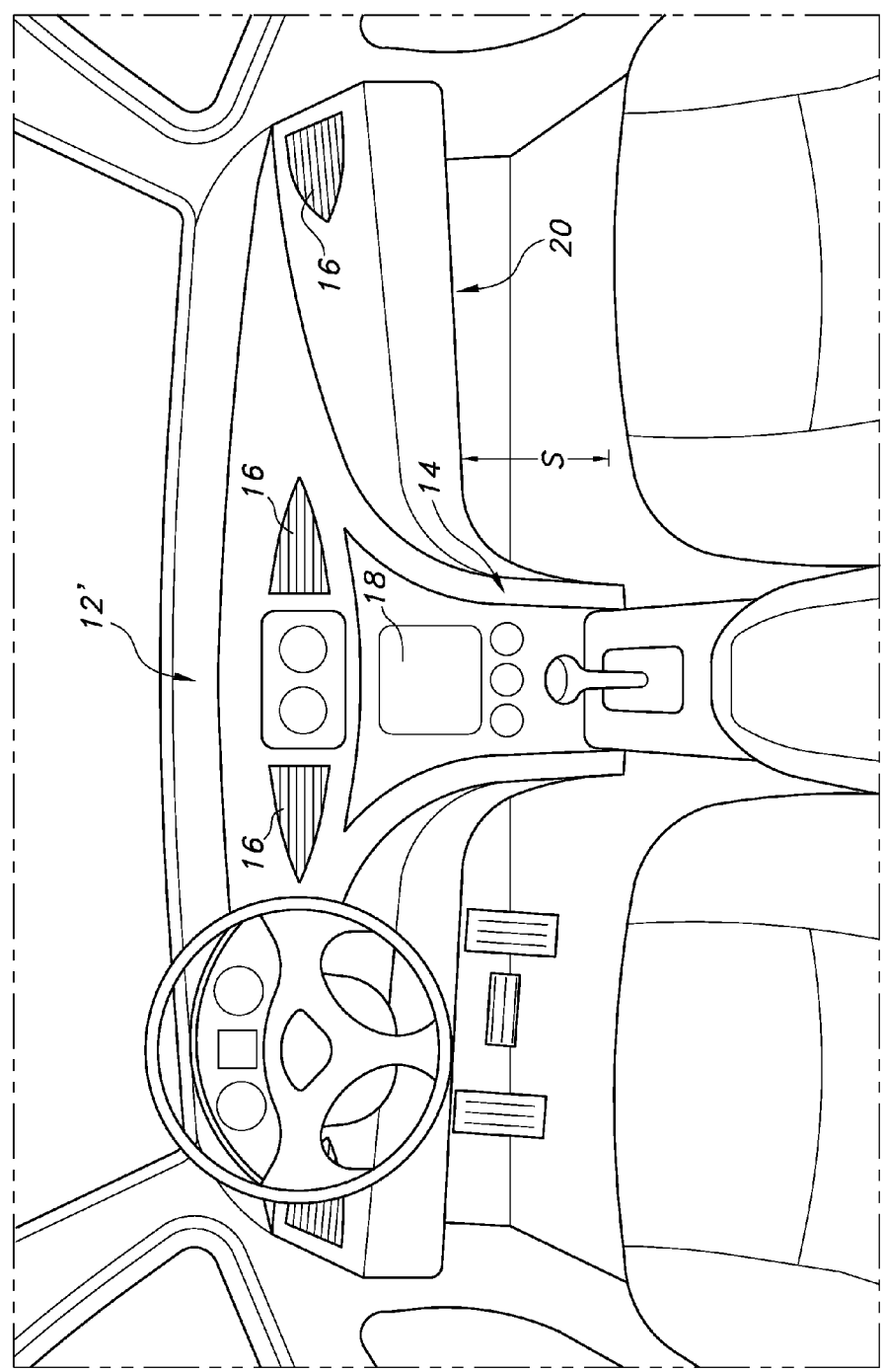
FIG. 2A shows a vehicle dash panel including a dash panel storage compartment according to the present disclosure in a fully stowed configuration.

With reference to FIG. 2A, a vehicle dash panel 12' including a dash panel storage compartment 20 according to the present disclosure is shown. As depicted, the dash panel storage compartment 20 is substantially hidden from view when in a closed, stowed configuration (see FIG. 2B). As can be seen, the dash panel storage compartment defines a significantly lower profile compared to the glove box 10 of FIG. 1, increasing the available space S below the dash panel 12' available for passenger legroom, item stowage, and the like.

Figure 2B:
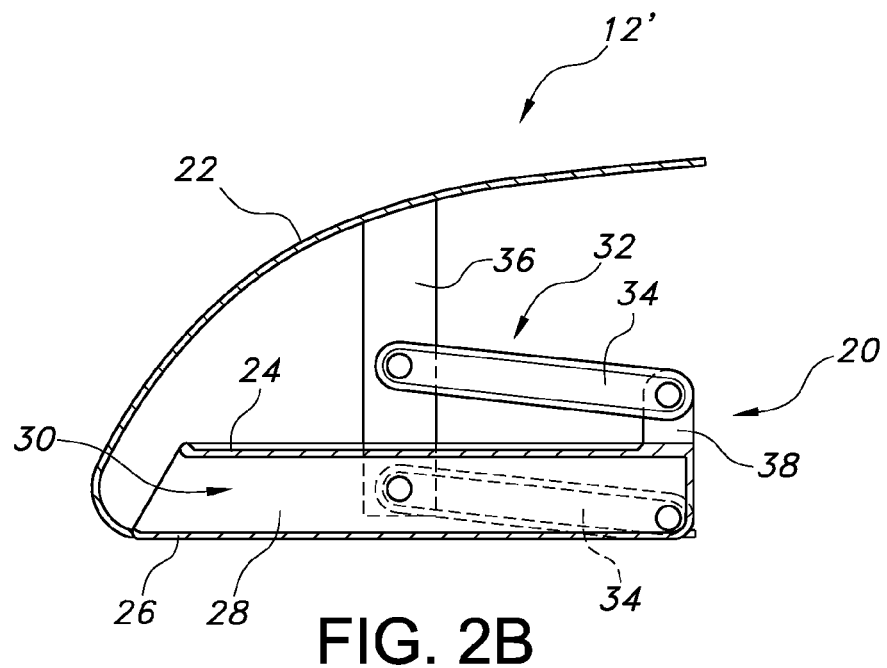
FIG. 2B is a side view of the dash panel storage compartment of FIG. 2A.
Figure 5:
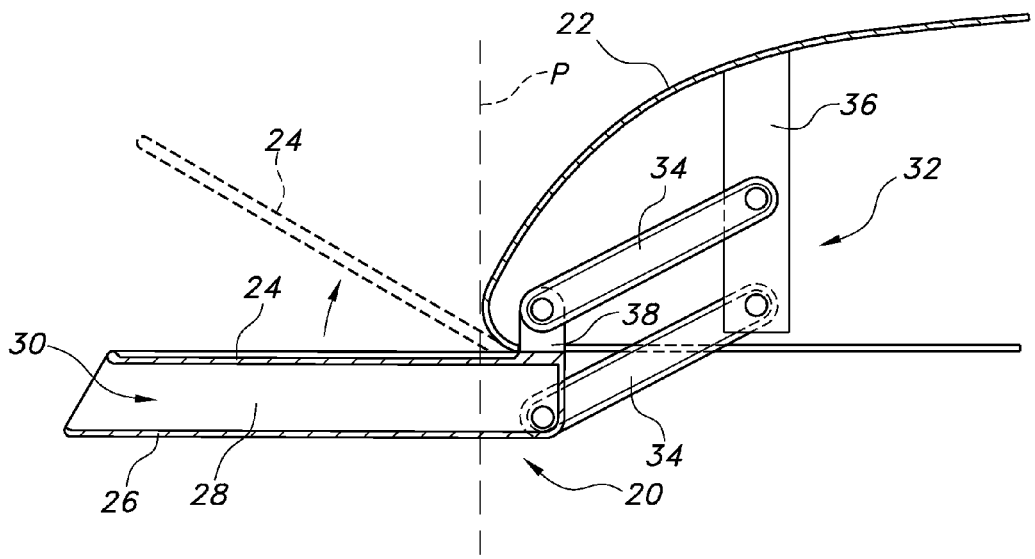
FIG. 5 shows the dash panel storage compartment of FIG. 2A in a fully deployed configuration.

As shown in FIG. 2B, the dash panel storage compartment 20, in the fully stowed configuration, is held entirely within an interior of the dash panel 12' housing 22. The dash panel storage compartment 20 includes a top 24, a bottom 26, and sides 28 defining a storage slot 30. In embodiments (see FIG. 5), the top 24 may be hingedly connected to the storage compartment 20 whereby, particularly in certain configurations of the storage compartment 20 as will be described, ease of access to items held in storage slot 30 is improved. The storage compartment 20 may further optionally include a closable door (not shown) to prevent items from inadvertently falling out of storage slot 30. Still more, a handle (not shown) may be provided on or in the material of bottom 26 for the user's convenience. The handle may be optionally recessed for aesthetic and space-saving reasons.

Figure 3:
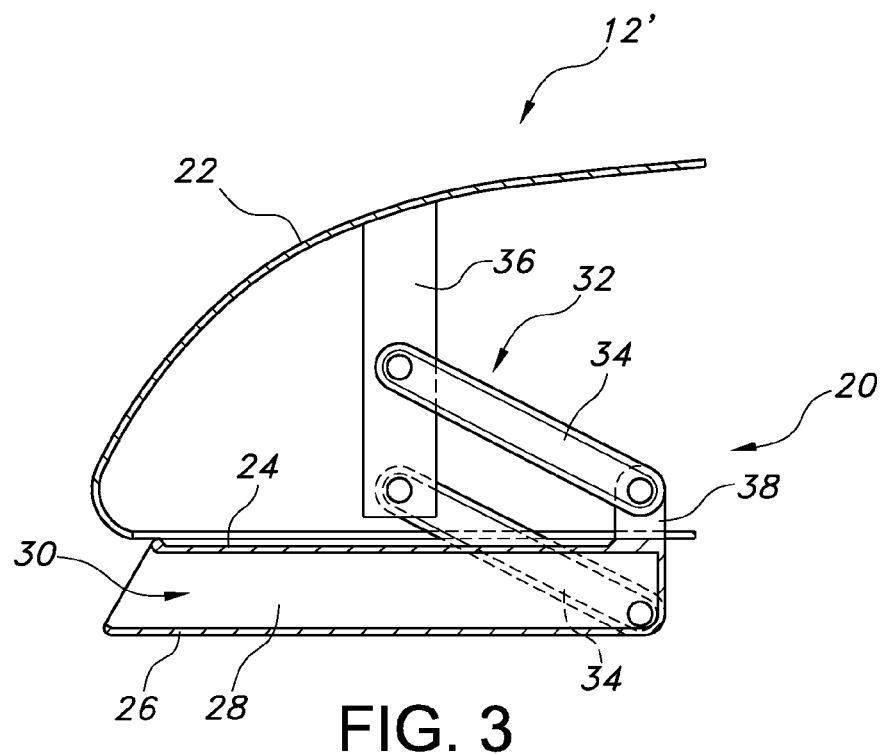
FIG. 3 shows the dash panel storage compartment of FIG. 2A in a first intermediate deployed configuration.
Figure 4:
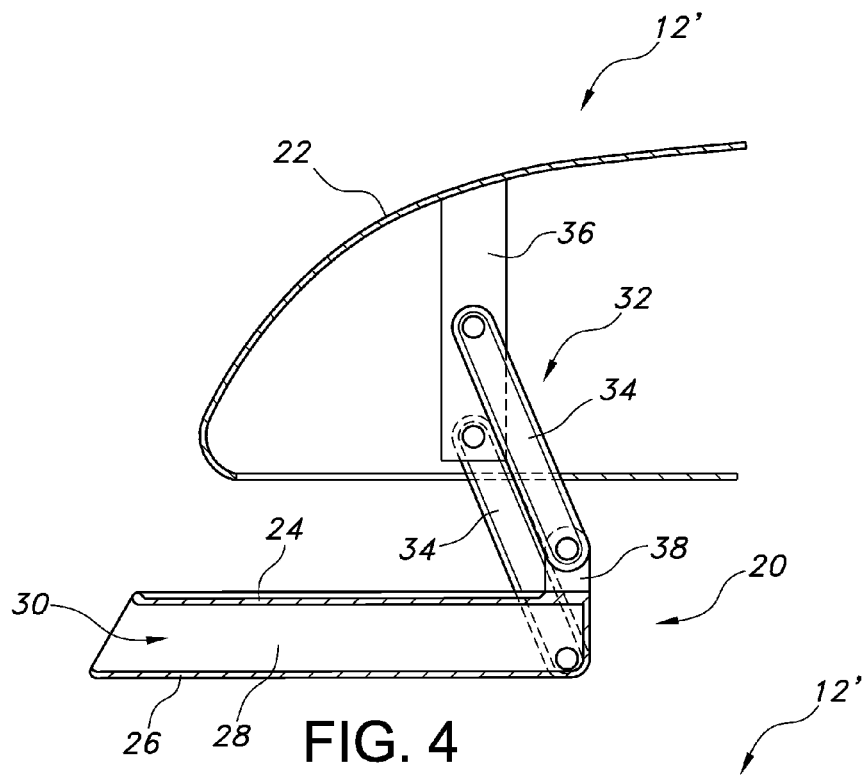
FIG. 4 shows the dash panel storage compartment of FIG. 2A in a second intermediate deployed configuration.

The dash panel storage compartment 20 is configured for displacing between a fully stowed configuration (FIGS. 2A and 2B) and a variety of intermediate and final deployed configurations including a first intermediate deployed configuration wherein only the storage slot 30 is accessible to a user (FIG. 3). In a second intermediate deployed configuration (FIG. 4), the storage slot 30 is accessible, and the user also has limited access to the top 24 of the storage compartment 20, for example for holding slim items such as books, electronic devices, etc. In a fully deployed configuration (FIG. 5), the storage compartment 20 is pulled down and forward, such that the storage compartment 20 is held outside of a vertical plane P defined by the dash panel housing 22. In this configuration, as will be appreciated not only can the user access storage slot 30, including by lifting top 24, but also can use top 24 as a tray to support items such as books, electronic devices, food, and the like. In each of the described configurations, however, the storage compartment utilizes significantly less of the available space below the dash panel housing 22 as compared to a conventional glove box design.

To allow the storage compartment 20 to be translated between the above-described configurations, a pivoting mechanism 32 is provided. In an embodiment, the pivoting mechanism 32 includes a plurality of struts 34 pivotally attached at a first end to a support 36 in an interior of the dash panel housing 22. The struts 34 are pivotally attached at an opposed second end to the rear of the storage compartment 20. In the depicted embodiment, a pair of struts 34 are provided, each attached to a bracket 38 disposed at each rear corner of the storage compartment 20. However, it will be appreciated that a number of alternative embodiments are possible. For example, a single strut 34 could be provided at each rear corner of the storage compartment 20. Alternatively, a single strut 34 could be provided, pivotally attached to a bracket disposed at a center of the rear of the storage compartment 20. In turn, instead of depending support 36, the one or more struts 34 could be attached to other elements disposed in the interior of the dash panel housing 22, such as smaller brackets, horizontal support members of the dash panel, etc. All such embodiments are contemplated herein.

To allow the storage compartment 20 to be held in the fully stowed, intermediate deployed, and fully deployed configurations described above until a user elects to translate the storage compartment 20 to a different configuration, a variety of mechanisms are known in the art and are contemplated for use. These can include a variety of locking mechanisms, pressure and/or friction fittings, detents, tension or compression springs, cam locks, pneumatic cylinders, and others. Such mechanisms are well known to the skilled artisan, and do not require extensive discussion herein.

Without intending any limitation, in embodiments the storage compartment 20 can be held in the fully stowed configuration by a substantially conventional striker and latch mechanism. For holding the storage compartment in the various described intermediate and fully deployed configurations, struts 34 can be provided with detents of known design. In alternative embodiments, a spring-loaded button can be provided which, when depressed, allows the storage compartment 20 to be translated between the described fully stowed, intermediate deployed, and fully deployed configurations described above. As another non-limiting example, a button or switch can be operatively linked to a cable-activated pneumatic damper which dampens motion of the storage compartment 20 when the button or switch is depressed, but which locks the storage compartment 20 in place when the button or switch is released. Of course, alternative arrangements are possible and are contemplated for use herein.

The benefits of the presently disclosed dash panel storage compartment assembly 20 are apparent. Useful, necessary, and/or desirable items such as user's manuals, GPS devices, and other slim electronic devices can be held in the storage slot 30 and/or on the tray surface provided by the storage compartment top 24. When a need arises for additional storage or a tray surface on which to rest food, books, maps, or other like items, the storage compartment 20 may be translated to the alternative configurations described above. This all occurs using a storage compartment 20 which, even in deployed configurations, presents a much lower profile than the conventional glove box, significantly increasing the available space below the vehicle dash panel.

Obvious modifications and variations are possible in light of the above teachings. All such modifications and variations are within the scope of the appended claims when interpreted in accordance with the breadth to which they are fairly, legally and equitably entitled.

What is claimed:

1. A vehicle dash panel storage compartment, comprising:
   a storage compartment including at least a top, a bottom, and sides defining a storage slot, wherein the top is hingedly connected to the storage compartment; and
   a pivoting mechanism configured to translate the storage compartment between a stowed configuration within an interior of a housing of the instrument panel and a plurality of deployed configurations.

2. The dash panel storage compartment of claim 1, wherein the plurality of deployed configurations include a first deployed configuration whereby only the storage slot is accessible below the instrument panel housing.

3. The dash panel storage compartment of claim 1 wherein the plurality of deployed configurations include a second deployed configuration whereby the storage slot and the storage compartment top are accessible below the instrument panel housing.

4. The dash panel storage compartment of claim 1, wherein the plurality of deployed configurations include a third deployed configuration whereby the storage compartment top is disposed substantially adjacent to a vertical plane defined by the instrument panel housing.

5. The dash panel storage compartment of claim 1, wherein the pivoting mechanism comprises at least one strut pivotally connected at a first end to a support and at a second end to the storage compartment.

6. The dash panel storage compartment of claim 4, wherein the pivoting mechanism comprises four struts each pivotally connected at a first end to a support and at a second end to the storage compartment.

7. A vehicle dash panel, comprising:
   a housing; and
   a dash panel storage compartment carried by a pivoting mechanism and including a storage slot defined by at least a top, a bottom, and sides, wherein the top is hingedly connected to the storage compartment;
   wherein the pivoting mechanism is configured to translate the storage compartment between a stowed configuration within an interior of the housing and a plurality of deployed configurations.

8. The dash panel of claim 7, wherein the pivoting mechanism comprises at least one strut pivotally connected at a first end to a support and at a second end to the storage compartment.

9. The dash panel of claim 8, wherein the pivoting mechanism comprises four struts each pivotally connected at a first end to the support and at a second end to the storage compartment.

10. The dash panel of claim 7, wherein the plurality of deployed configurations include a first deployed configuration whereby only the storage slot is accessible below the housing.

11. The dash panel of claim 7, wherein the plurality of deployed configurations include a second deployed configuration whereby the storage slot and the storage compartment top are accessible below the housing.

12. The dash panel of claim 7, wherein the plurality of deployed configurations include a third deployed configuration whereby the storage compartment top is disposed substantially adjacent to a vertical plane defined by the instrument panel housing.

13. A vehicle including the dash panel of claim 7.

14. A vehicle dash panel storage compartment, comprising:
   a storage compartment including at least a hinged top, a bottom, and sides defining a storage slot; and
   a pivoting mechanism configured to translate the storage compartment between a stowed configuration within an interior of a housing of the dash panel, one or more intermediate deployed configurations, and a fully deployed configuration whereby the storage compartment top is disposed adjacent to a vertical plane defined by the housing.

15. The dash panel storage compartment of claim 14, wherein the pivoting mechanism comprises at least one strut pivotally connected at a first end to a support and at a second end to the storage compartment.

16. The dash panel storage compartment of claim 15, wherein the pivoting mechanism comprises four struts each pivotally connected at a first end to the support and at a second end to the storage compartment.

17. The dash panel storage compartment of claim 14, wherein one of the plurality of intermediate deployed configurations disposes only the storage slot exterior of the housing.

18. The dash panel storage compartment of claim 14, wherein another of the plurality of intermediate deployed configurations disposes the storage slot and the storage compartment top exterior of the housing.

* * * * *